United States Patent
Schmale

(10) Patent No.: US 10,987,863 B2
(45) Date of Patent: Apr. 27, 2021

(54) METHOD AND APPARATUS TO RECYCLE 3D BUILD MATERIAL

(71) Applicant: HEWLETT-PACKARD DEVELOPMENT COMPANY, L.P., Houston, TX (US)

(72) Inventor: Joshua Schmale, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 106 days.

(21) Appl. No.: 16/077,746

(22) PCT Filed: Jul. 28, 2017

(86) PCT No.: PCT/US2017/044384
§ 371 (c)(1),
(2) Date: Aug. 14, 2018

(87) PCT Pub. No.: WO2019/022767
PCT Pub. Date: Jan. 31, 2019

(65) Prior Publication Data
US 2019/0193332 A1    Jun. 27, 2019

(51) Int. Cl.
*B29C 64/357* (2017.01)
*B29C 64/35* (2017.01)
(Continued)

(52) U.S. Cl.
CPC ............ *B29C 64/35* (2017.08); *B29C 64/153* (2017.08); *B29C 64/245* (2017.08);
(Continued)

(58) Field of Classification Search
CPC ..... B29C 64/35; B29C 64/357; B29C 64/153; B29C 64/245; B29C 64/386
See application file for complete search history.

(56) References Cited

U.S. PATENT DOCUMENTS

| 8,267,683 B2 | 9/2012 | Inoue |
| 9,498,848 B2 | 11/2016 | Garry |

(Continued)

FOREIGN PATENT DOCUMENTS

| WO | 2015108551 A1 | 7/2015 | |
| WO | 2016165745 A1 | 10/2016 | |
| WO | WO-2017017274 A1 * | 2/2017 | ............ B29C 64/35 |

OTHER PUBLICATIONS

"Comparing Additive Manufacturing Technologies for Customised Wrist Splints", Loughborough University Institutional Repository, Retrieved from Internet: https://dspace.lboro.ac.uk/dspace-jspui/bitstream/2134/17656/1/Final%20RPJ%20submission.pdf, 2015, 26 pages.

*Primary Examiner* — Joseph S Del Sole
*Assistant Examiner* — John Robitaille
(74) *Attorney, Agent, or Firm* — HP Inc. Patent Department

(57) ABSTRACT

Methods, apparatus, systems and articles of manufacture are disclosed to recycle 3D build material including a 3D printer having a build platform, a vibration generator to alternately apply a first vibration mode to the build platform to move build material on the build platform in a first direction, and to apply a second vibration mode to the build platform to move the build material in a second direction and an air handler to generate an airflow to remove the build material from the build platform.

20 Claims, 9 Drawing Sheets

(51) Int. Cl.
  *B33Y 30/00*  (2015.01)
  *B33Y 40/00*  (2020.01)
  *B29C 64/245* (2017.01)
  *B33Y 50/00*  (2015.01)
  *B29C 64/153* (2017.01)
  *B29C 64/386* (2017.01)
  *B29K 55/02*  (2006.01)
  *B29K 77/00*  (2006.01)
  *B29K 509/08* (2006.01)

(52) U.S. Cl.
  CPC .......... *B29C 64/357* (2017.08); *B29C 64/386* (2017.08); *B33Y 30/00* (2014.12); *B33Y 40/00* (2014.12); *B33Y 50/00* (2014.12); *B29K 2055/02* (2013.01); *B29K 2077/00* (2013.01); *B29K 2509/08* (2013.01)

(56) References Cited

U.S. PATENT DOCUMENTS

| | | |
|---|---|---|
| 2001/0045678 A1 | 11/2001 | Kubo et al. |
| 2004/0084814 A1* | 5/2004 | Boyd .................... B29C 64/153 |
| | | 264/497 |
| 2015/0266158 A1 | 9/2015 | Summers et al. |
| 2015/0266211 A1 | 9/2015 | Wolfgang et al. |
| 2016/0074940 A1 | 3/2016 | Cote et al. |
| 2016/0211119 A1 | 7/2016 | Lock |

\* cited by examiner

METHOD AND APPARATUS TO RECYCLE 3D BUILD MATERIAL

BACKGROUND

Some three-dimensional (3D) printers deposit successive layers of a 3D build material (e.g., a nylon powder, a metal powder, etc.) and fuse or bond selected portions of the 3D build material for each layer by applying energy, such as electromagnetic energy, or a reactant, such as a binder, to the layer of the 3D build material. This assembly process continues, layer-by-layer, until the entire 3D product is completed. When the 3D product is complete, unused build material may be removed and recycled to some extent.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
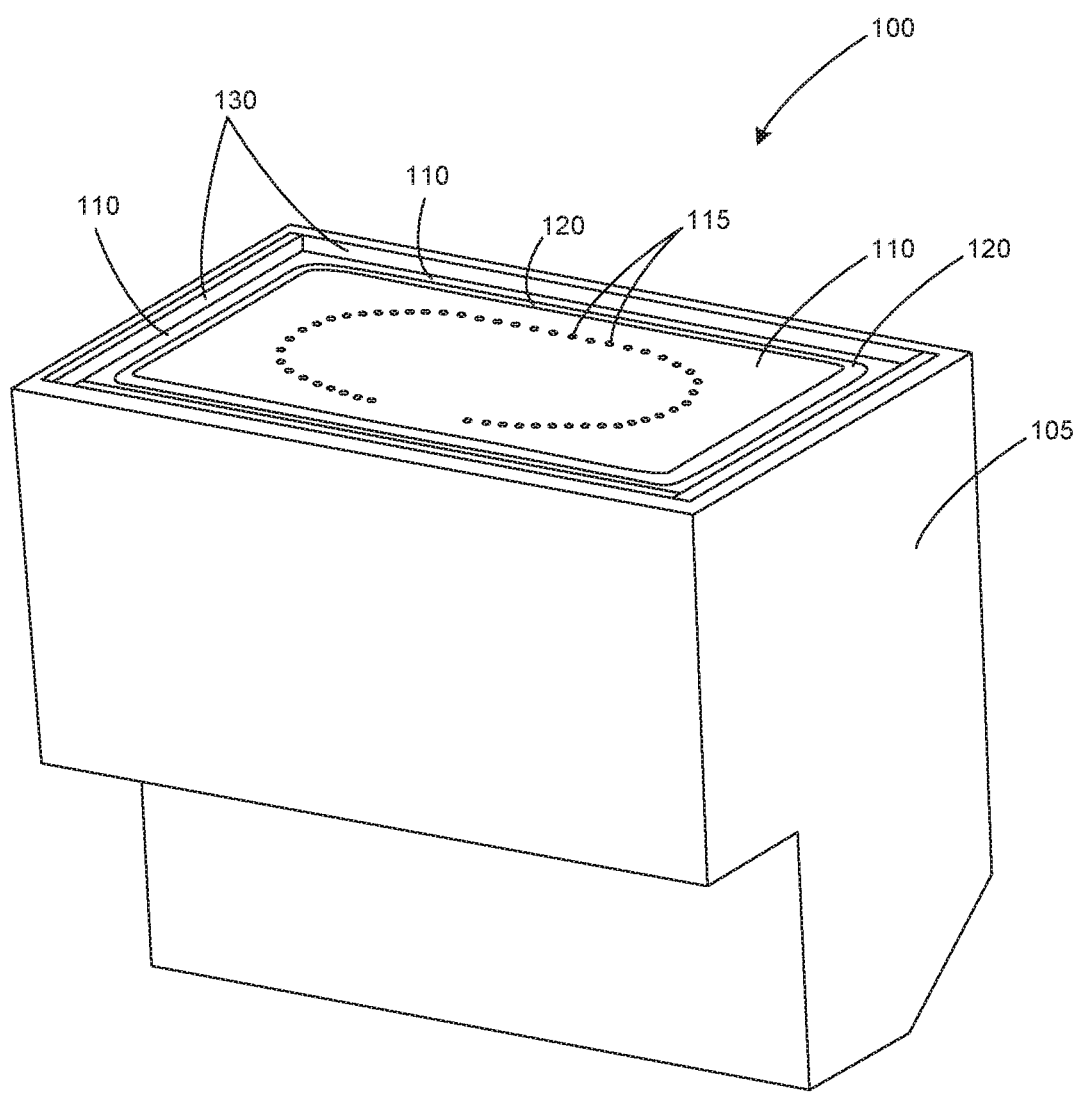
FIG. 1 is a rear perspective view of an example 3D printer showing an example build platform in accordance with teachings of this disclosure.

FIG. 1 is a rear perspective view of an example 3D printer 100 including an example housing 105 and an example build platform 110 in accordance with teachings of this disclosure. In the illustrated example of FIG. 1, the build platform 110 includes example through holes 115 which are used to remove 3D build material from the build platform 110 following completion of a workpiece. The through holes 115 in the build platform 110 are to provide a pathway for gas and build material to move from a top of the build platform to a chamber at the bottom of the build platform 110, discussed in relation to FIGS. 4-5.

In some examples, the through holes 115 are arranged in a pattern, an array, randomly, or in another arrangement and may be substantially similar in size or may include two or more different sizes. Additionally, a spacing between the through holes 115 may be uniform or dissimilar. In the illustrated example of FIG. 1, the through holes 115 are arranged in a generally ovoid shape with a diameter of about 2 mm (+/−0.1 mm) and a spacing between the through holes 115 is not uniform.

In some examples, the build platform 110 is constructed to maintain a fixed horizontal attitude relative to the housing 105 throughout a range of vertical motion of the build platform 110. In some examples, the build platform 110 is constructed to tilt relative to the housing 105 (e.g., 1° relative to horizontal, 2° relative to horizontal, etc.) during a recycling operation to remove unused 3D build material.

In the illustrated example of FIG. 1, a damping element 120 is disposed between the build platform 110 and lateral walls 130 of a build area to vibrationally isolate, in whole or in part, the build platform 110 from the lateral walls 130, which are stationary relative to the build platform 110. In some examples, the damping element 120 is disposed about a periphery of the build platform 110 to form a buffer between the build platform 110 and the lateral walls 130. In some examples, the damping element 120 is disposed in the build platform 110 to form to vibrationally isolate, in whole or in part, a first portion of the build platform 110 (e.g., an inner portion) from a second portion of the build platform 110 (e.g., an outer portion). In some examples, the damping element 120 includes a rubber (e.g., a Nitrile butadiene rubber (NBR), a silicone rubber compound, etc.) of a selected hardness (e.g., 45 Shore A, 60 Shore A, 70 Shore A, etc.). In some examples, the lateral edges of the build platform 110 are displaced from the lateral walls 130 of the build area of the 3D printer 100 and the damping element 120 includes a resilient sealing element matingly engaging the lateral walls 130.

Figure 2:
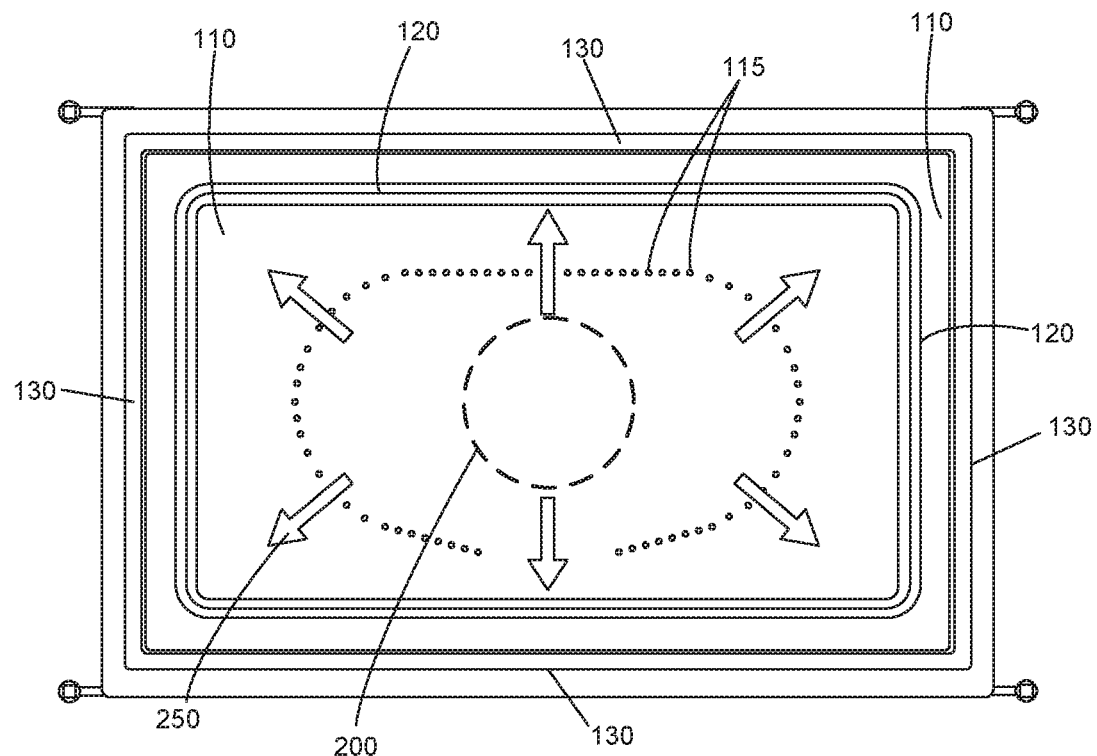
FIG. 2 is a top view of an example build platform of FIG. 1 operating in an example first state in accordance with teachings of this disclosure.
Figure 3:
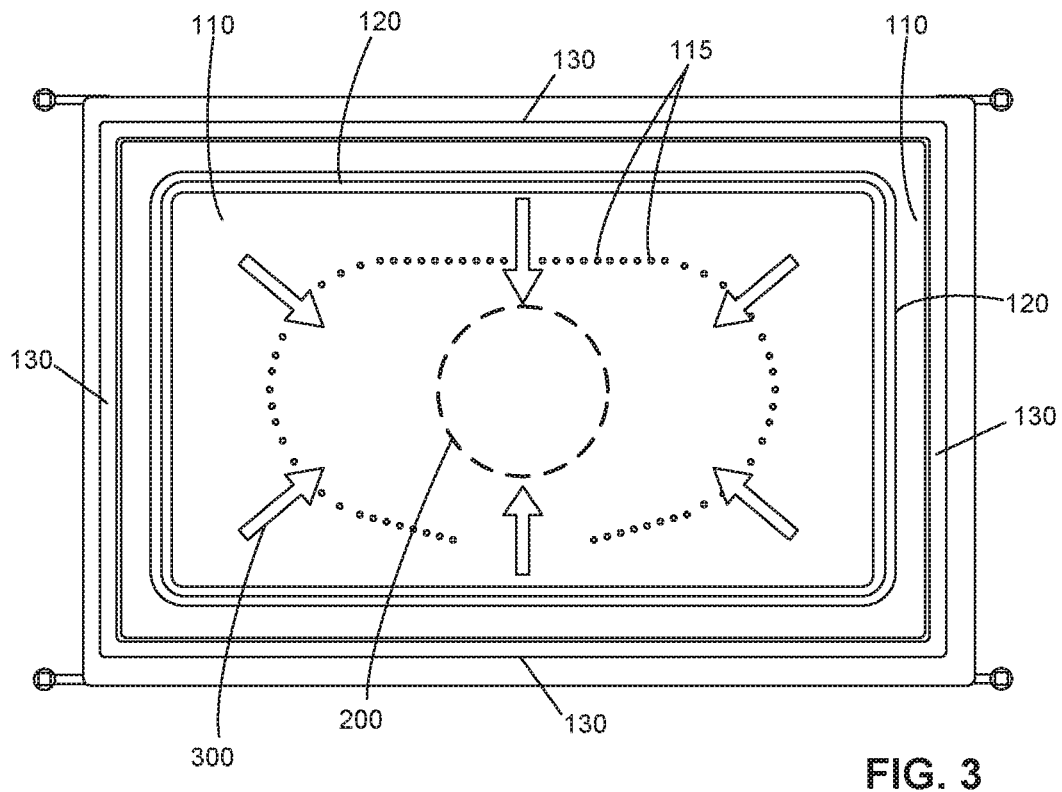
FIG. 3 is a top view of an example build platform of FIG. 1 operating in an example second state in accordance with teachings of this disclosure.

FIGS. 2-3 are top views of the build platform 110 of FIG. 1 showing, via dashed lines, an example vibration generator 200 attached to an example bottom location of the build platform 110. In the example of FIG. 2, the vibration generator 200 is to apply a first vibration mode to the build platform 110 to move unused 3D build material (e.g., powder) on the build platform 110 in a first direction (e.g., outwardly in a direction indicated by the arrows 250). In the example of FIG. 3, the vibration generator 200 is to apply a second vibration mode to the build platform 110 to move unused 3D build material (e.g., powder) on the build platform 110 in a second direction (e.g., inward direction indicated by the arrows 300). A direction in which the unused 3D build material is moved (e.g., toward the through holes 115, away from the through holes 115, outwardly toward a periphery of the build platform 110, inwardly toward a central portion of the build platform 110, etc.) is selectable via the vibration mode.

The first vibration mode and the second vibration mode are implemented subsequent to a completion of a printing operation to facilitate a recycling operation. In some examples, the recycling operation includes application of the first vibration mode followed by the second vibration mode. In some examples, the recycling operation includes alternately applying the first vibration mode and the second vibration mode. For instance, the vibration generator 200 may repeatedly apply the first vibration mode and the second vibration mode to the build platform 110 in an alternating manner.

In some examples, the vibration generator 200 includes a mechanical shaker, such as brushless DC motor with an eccentric mass to impart vibration. For instance, the vibration generator 200 may include a Model DIA42620W32A, 20 watt brushless DC motor with an eccentric mass manufactured by MinebeaMitsumi Inc. of Japan. In some examples, the vibration generator 200 includes an electrodynamic shaker, such as a piezo-shaker or an electromagnetic-shaker. In some examples, the vibration generator 200 includes a first vibration generator to produce the first vibration mode and a second vibration generator to produce the second vibration mode.

In some examples, the vibration generator 200, in the first vibration mode, is to vibrate the build platform 110 at one or more frequencies in a first range of frequencies and the vibration generator 200, in the second vibration mode, is to vibrate the build platform 110 at one or more frequencies in a second range of frequencies different than the first range of frequencies. In some examples, the first range of frequencies is between about 20 Hz (e.g., +/−1 Hz) to about 50 Hz (e.g., +/−1 Hz) or a subset of frequencies therebetween. In some examples, the second range of frequencies is between about 55 Hz (e.g., +/−1 Hz) to about 150 Hz (e.g., +/−1 Hz) or a subset of frequencies therebetween. For instance, the vibration generator 200 is to vibrate, in the first vibration mode, at about 40 Hz and is to vibrate, in the second vibration mode, at about 65 Hz.

In some examples, the vibration generator 200, in the first vibration mode, is to vibrate the build platform 110 at one or more of the frequencies in the first range of frequencies over a first period between about 1-10 seconds. Subsequent to the first vibration mode, the vibration generator 200, in the second vibration mode, is to vibrate the build platform 110 at one or more of the frequencies in the second range of frequencies over a second period between about 1-10 seconds. In some examples, the vibration generator 200 is to pause application of vibrations to the build platform for up to about 5 seconds between the first vibration mode and the second vibration mode. In some examples, the vibration generator 200 transitions between the first vibration mode and the second vibration mode without pause. For instance, an example first vibration mode includes vibration at about 40 Hz for a duration of about 2 seconds (e.g., +/−0.1 seconds) to move build material (e.g., unused 3D build material) on the build platform 110 in a first direction, as shown by the arrows 250 in FIG. 2, followed by a pause of about 4 seconds. An example second vibration mode includes vibration at about 65 Hz for a duration of about 6 seconds (e.g., +/−0.1 seconds) to move build material (e.g., unused 3D build material) on the build platform 110 in a second direction, as shown by the arrows 300 in FIG. 3, followed by a pause of about 2 seconds.

The first vibration mode and/or the second vibration mode may be tuned responsive to characteristics of the 3D build material and/or bulk 3D build material (e.g., powder static properties, powder dynamic properties, powder flowability, powder shape and aspect ratio, powder morphology, powder uniformity, powder size, layer density, etc.). Thus, in some examples, characteristics of the first vibration mode and/or the second vibration mode (e.g., frequency, duration, etc.) and/or characteristics of combinations of the first vibration mode and the second vibration mode (e.g., holding a first vibration mode constant while implementing variations to a second vibration mode, etc.) are varied and observed with respect to a particular 3D build material and a particular workpiece of interest on the build platform 110. Similar to determining a system resonance, this enables determination of a suitable combination of the first vibration mode and the second vibration mode to alternately move the 3D build material on the build platform 110 in a first direction (corresponding to FIG. 2) and to move the 3D build material on the build platform 110 in a second direction (corresponding to FIG. 3) to facilitate recycling of the 3D build material, such as via the example through holes 115.

Figure 4:
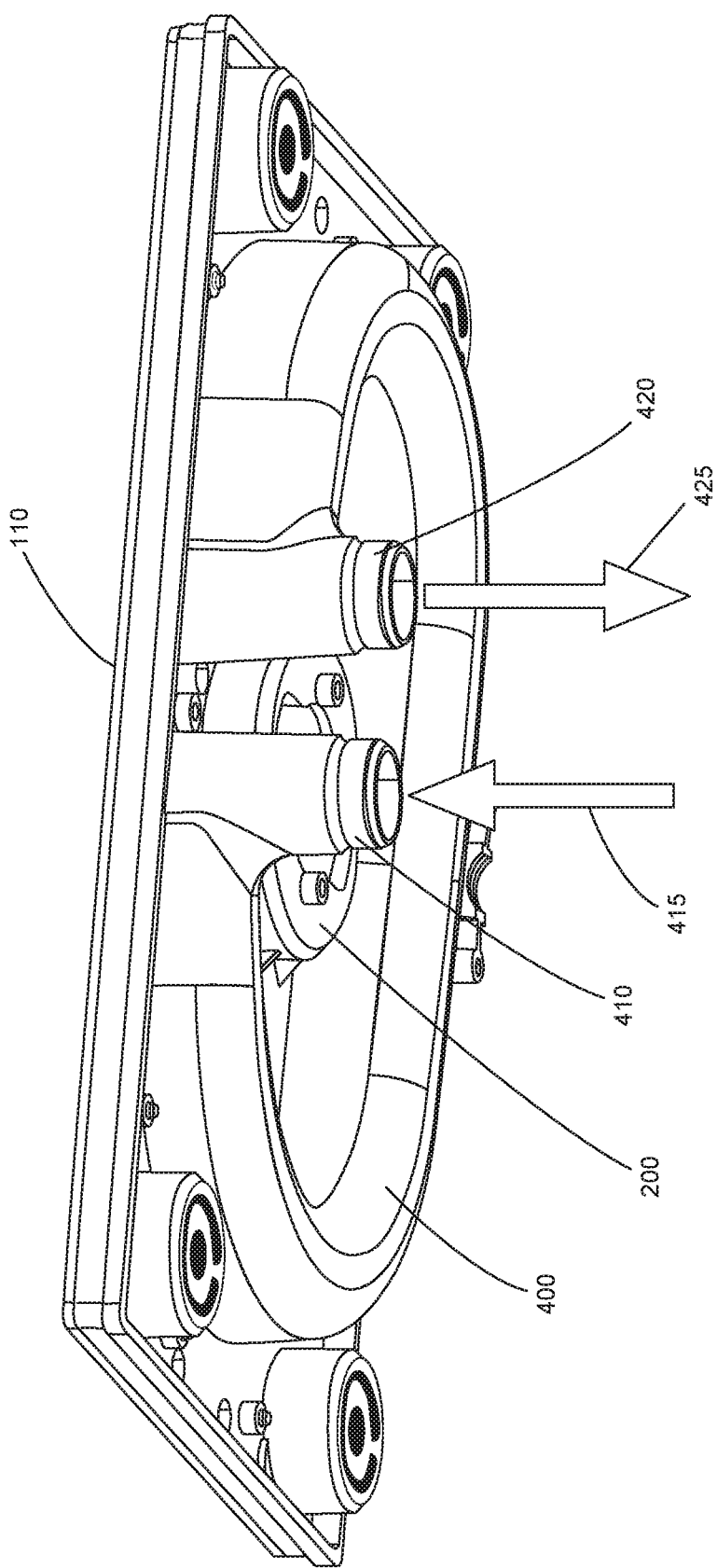
FIG. 4 is a bottom perspective view of the example build platform of FIGS. 1-3 in accordance with teachings of this disclosure.

FIG. 4 is a bottom perspective view of the example build platform 110 of FIGS. 1-3 in accordance with teachings of this disclosure. In the illustrated example of FIG. 4, a bottom of the build platform 110 includes an example chamber 400 that is connected to an air handler (see FIG. 5) via an example flow inlet 410 which receives air inflow 415 and an example flow outlet 420 which passes air outflow 425. In the illustrated example of FIG. 4, the example chamber 400 is annularly-shaped, corresponding to the example elliptical pattern of through holes 115 in the example of FIGS. 1-3, where the flow inlet 410 is provided at a first end of the chamber 400 and the flow outlet 420 is provided at a second end of the chamber. In some examples, the chamber 400 is to be maintained at a negative pressure during a powder recycling operation. In the illustrated example of FIG. 4, the cross-sectional area of the chamber 400 is about 1200 mm$^2$ (e.g., 30 mm×40 mm). In some examples, the cross-sectional area of the chamber 400 is greater than about 1200 mm$^2$ or is less than about 1200 mm$^2$.

In some examples, the arrangement of the through holes 115 and/or the shape of the chamber 400 may be different than the example illustrated in FIGS. 1-3. For instance, by way of example, the through holes 115 and the chamber 400 may be arranged in a linear, curvilinear, serpentine, circular and/or semicircular shape. The example flow inlet 410 and the example flow outlet 420 may include any manner of mechanical connector such as, but not limited to, a push on hose fitting, a barbed hose fitting, a bayonet type coupler, a quick connect coupler, a male connector or a female connector. In some examples, a plurality of chambers 400 may be provided with a corresponding plurality of flow inlets 410 and flow outlets 420. For instance, the chamber 400 may include a first chamber having a first flow inlet and a first flow outlet and a second chamber having a second flow inlet and a second flow outlet, with each of the first chamber and the second chamber being aligned with a corresponding first set of through holes and a second set of through holes.

Figure 5:
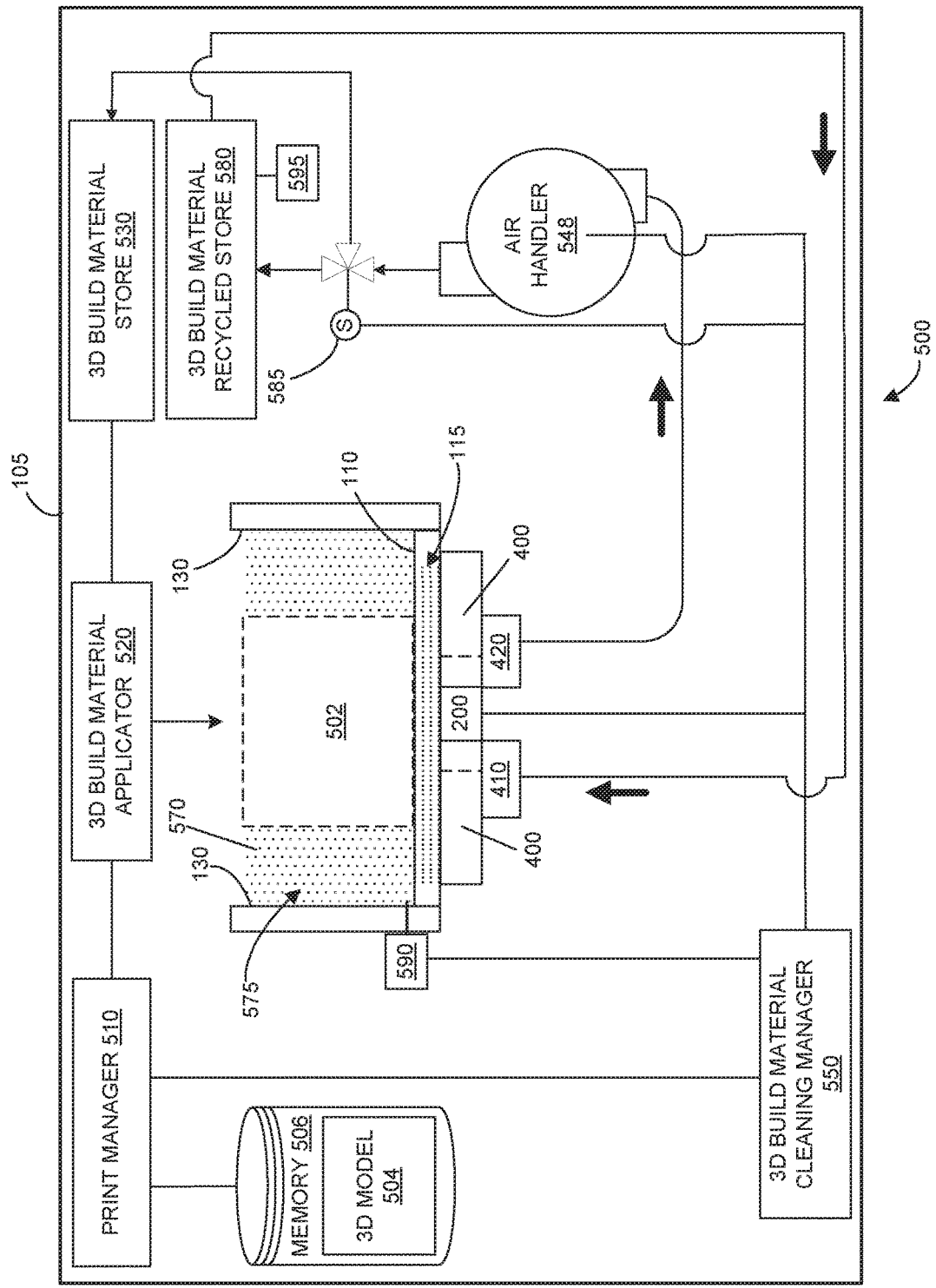
FIG. 5 is a block diagram of an example apparatus to recycle 3D build material in accordance with teachings of this disclosure.

FIG. 5 is a block diagram of an example 3D printer 500 to recycle 3D build material in accordance with teachings of this disclosure. The example flow inlet 410, the example flow outlet 420 and the example vibration generator 200 of FIG. 4 are shown to be connected to a bottom of the build platform 110.

In the illustrated example of FIG. 5, the build platform 110 is shown in a lowered position following completion of an example product 502 corresponding to an example product model 504 stored in an example memory 506 operatively associated with an example print manager 510. The product model 504 may include instructions in a 3D printing file format, such as but not limited to, the 3D Manufacturing Format (3MF) Specification and Reference Guide, Ver. 1.1 (2015), including all model, material and property information to form the desired product using the example 3D printer 500.

The example print manager 510 is constructed to control the 3D printing operation for the example product 502 and to coordinate a movement of (e.g., lowering, raising, etc.)

the build platform 110, via an actuator (not shown), and printing of the product 502 via the 3D build material applicator 520 using one or more 3D build materials drawn from one or more 3D build material store(s) 530.

In the example of FIG. 5, the movable platform 110 is disposed to receive 3D build material (e.g., a nylon powder, a glass-filled nylon powder, an acrylonitrile butadiene styrene (ABS) powder, etc.) from a 3D build material applicator 520, which receives 3D build material from the 3D build material store 530. The 3D build material applicator 520 is to selectively deposit a layer of 3D build material (e.g., a layer having a thickness of between of about 30-60 microns, between about 60-100 microns, etc., with a variance of +/−3 microns) onto the moveable platform, or adjacent the moveable platform, under the control of a print manager 510. In some examples, the 3D build material applicator 520 delivers 3D build material to a choked-flow hopper, which forms a pile/ribbon of build material next to the build platform. A recoater (e.g., a roller, etc.) then spreads the build material over the build platform 110 to form a layer of 3D build material.

After the 3D build material is deposited in a layer across the example movable platform 110, selected portions of the 3D build material are fused (e.g., selective laser sintering, selective laser melting, selective heat sintering, etc.) by a fusing element (not shown) or bonded by application of a bonding agent, in a pattern directed by the print manager 510 and corresponding to a product model 504 stored in a memory 506 operatively associated with the print manager 510. The product model 504 may include instructions in a 3D printing file format.

Following formation of a layer and bonding or fusing of selected portions of the layer in accordance with the product model 504, the print manager 510, via an actuator, incrementally moves the moveable platform 110 and the volume of build material in the build chamber downwardly relative to the 3D build material applicator 520. The print manager 510 then causes the 3D build material applicator 520 to deposit another layer of 3D build material on the moveable platform 110 on an upper surface of the 3D build material (e.g., fused and unfused 3D build material) in the build chamber. The next deposited layer is then selectively fused or bonded in a pattern directed by the print manager 510 in correspondence to the product model 504 stored in the memory 506. This process of applying a layer, bonding or fusing selected portions of the layer and moving of the movable platform 110 relative to the 3D build material applicator 520 (or vice versa) continues iteratively to build the workpiece 502. As the movable platform 110 is lowered, walls 130 form a lateral boundary about the movable platform 110 to retain loose 3D build material.

The example print manager 510 is also operatively associated with an example 3D build material cleaning manager 550, which is operatively associated with the vibration generator 200 and the example air handler 548. Following a completion of printing of the product 502, the example print manager 510 instructs the 3D build material cleaning manager 550 to initiate a build material cleaning operation to recycle the unused 3D build material 570 in the build area. The 3D build material cleaning manager 550 then activates the air handler 548 to establish airflow through the chamber 400 sufficient to entrain and move 3D build material 570 entering the chamber 400 via the through holes 115 in the build plate 110. In some examples, the air handler 548 maintains airflow at a flow rate of above about 5 meters per second (m/s)(+/−0.5 m/s). The airflow rate may be fixed or variable. For instance, airflow may be implemented to drop at constant air handler 548 power as build material is added into the airflow. In some examples, the 3D build material cleaning manager 550 is to modulate airflow to ensure that the airflow is sufficient to entrain and transport the 3D build material 570 entering the chamber 400 to avoid a buildup of 3D build material 570 in the chamber 400. The airflow through the chamber 400 establishes in the chamber 400 an area of low pressure relative to the build chamber 575 (e.g., the area in which the example product 502 is built in the example 3D printer 500) to facilitate movement of the 3D build material 570 from the upper surface of the build platform 110 through the through holes 115 and into the chamber 400. In some examples, the air handler 548 includes two U85HL-024KM-4 blowers, manufactured by Micronel AG of Switzerland, disposed in parallel.

The air handler 548 moves the entrained 3D build material 570 from the chamber 400 to an example 3D build material recycled store 580 and/or the 3D build material store 530 where it may be reused. In some examples, an example diverter 585 is used to divert airflow from the air handler 548 to one or more destination locations. In some examples, the diverter 585 includes a movable damper or a valve (e.g., a 2-way or 3-way valve) that is manually-operated and/or pneumatically-operated, motor-operated, or solenoid-operated. For example, a first position of the diverter 585 is used to direct airflow and the entrained 3D build material 570 to the 3D build material recycled store 580 and a second position of the diverter 585 is used to direct airflow and the entrained 3D build material 570 to the 3D build material store 530. In some examples, the diverter 585 includes a movable damper that selectively isolates an airflow path to the 3D build material recycled store 580 or the 3D build material store 530 and directs airflow to the other of the 3D build material recycled store 580 or the 3D build material store 530.

In some examples, the chamber 400 and through holes 115 are omitted from the example 3D printer 100, 500 and, instead, the example flow inlet 410 and the example flow outlet 420 are connected to the build chamber 575 and are constructed provide airflow within the build chamber 575 to entrain and remove unused 3D build material 570. The removal of the unused 3D build material 570 from the build chamber 575 via airflow through the build chamber 575 is performed in combination with (e.g., in parallel, in series, contemporaneously, simultaneously, etc.) operation of the vibration generator 200. In some examples, the example flow inlet 410 includes a plurality of flow inlets 410, which may be connected to a manifold. In some examples, the example flow outlet 420 includes a plurality of flow outlets 420, which may be connected to a manifold.

An example sensor 590 (e.g., level switch, image sensor, load cell, acoustic sensor, optical detector, photoswitch, etc.) is provided in or adjacent the build chamber 575 to provide feedback to the example 3D build material cleaning manager 550 regarding a state of the example build chamber 575 during the recycling operation. For instance, the example sensor 590 is used to inform the example 3D build material cleaning manager 550 as to whether the recycling operation is complete or whether additional application of the first vibration mode, second vibration mode and/or airflow should be performed. In some examples, the example sensor 590 may include a plurality of sensors of the same type. In some examples, the example sensor 590 may include a plurality of sensors of a different type.

Figure 6:
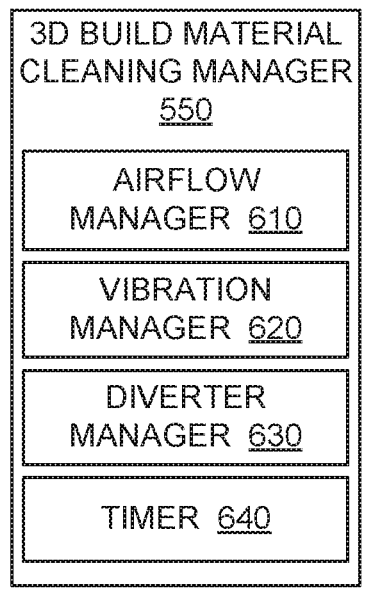
FIG. 6 is a block diagram of an example build material cleaning manager for the example 3D printer of FIGS. 1-5 constructed in accordance with teachings of this disclosure.

FIG. 6 shows an example 3D build material cleaning manager 550 including an example airflow manager 610, an example vibration manager 620, an example diverter manager 630 and an example timer 640.

The example 3D build material cleaning manager 550 is operatively associated with the print manager 510 and, responsive to an instruction from the print manager 510 to start a recycling operation, the 3D build material cleaning manager 550 controls operation of the recycling operation.

The example airflow manager 610 is to control operation of the air handler 548 during the recycling operation. For instance, in some examples, the example airflow manager 610 is to regulate airflow, such as to maintain an airflow at a predetermined setting (e.g., an airflow velocity of 5 m/s, 6 m/s, 7 m/s, etc.), which may include increasing and/or decreasing power to maintain the airflow at the predetermined setting. In some examples, the airflow manager 610 is to control the airflow in correspondence to an operational mode of the vibration generator 200, such as to control the airflow to a first setting during a first vibration mode and to control the airflow to a second setting at a second vibrational mode. In some examples, the airflow manager 610 is to control the airflow to a third setting during a pause between application of vibration to the build platform 110 by the vibration generator 200, such as during a pause inserted between application of the first vibration mode and the second vibrational mode. In some examples, the example airflow manager 610 and the example vibration manager 620 synchronize application of airflow via the air handler 548 with vibration via the vibration generator 200.

The example vibration manager 620 is to control operation of the vibration generator 200 during the recycling operation. For instance, the vibration manager 620 controls the vibration generator 200 to apply the first vibration mode and the second vibration mode to the build platform 110 and/or controls the vibration generator 200 to apply the first vibration mode and the second vibration mode to the build platform 110 in an alternating manner. As noted above, in some examples, the vibration manager 620 controls the vibration generator 200, in the first vibration mode, to vibrate the build platform 110 at one or more frequencies in a first range of frequencies and, in the second vibration mode, to vibrate the build platform 110 at one or more frequencies in a second range of frequencies different than the first range of frequencies. In some examples, the vibration manager 620 is operatively associated with the timer 640, which is used to govern a duration and timing of vibration applied by the vibration generator 200. In some examples, the example vibration manager is operatively associated with a graphical user interface (GUI) constructed to enable selection of vibration characteristics in the first vibration mode, in the second vibration mode, and in periods, if any, between the first vibration mode and the second vibration mode. In some examples, a plurality of selectable options are provided via the GUI corresponding to, for example, particular characteristics of the 3D build material or pre-defined user-settings.

The example diverter manager 630 is to control operation of the diverter 585 prior to, during or subsequent to the recycling operation. For instance, if the 3D build material cleaning manager 550 determines, via a sensor 595 (e.g., a level sensor, a weight sensor, etc.) in or adjacent the 3D build material recycled store 380 that the 3D build material recycled store 380 is nearing a full capacity, the example diverter manager 630 may actuate the diverter 585 to shift output of the recycled 3D build material 570 to the 3D build material store 530 to avoid interruption of the recycling operation (e.g., stopping the recycling operation to replace the 3D build material store 530 with an empty replacement 3D build material store 530.

The example timer 640 is to control timing of the recycling operation including operation of the vibration manager 620. In some examples, the example timer 640 is used to control the example vibration manager 620 and is not used to control the example airflow manager 610. For instance, in some examples, the example airflow manager 610 is started by the example 3D build material cleaning manager 550 at a beginning of the recycling operation and continues operation throughout the recycling operation until a sensor 590 (e.g., level switch, image sensor, load cell, acoustic sensor, photoswitch, etc.) in or adjacent the build chamber 575 is activated (or deactivated, as appropriate) indicates, such as by reaching a predetermined setting or a user-selected setting, that the 3D build material has been removed from the build chamber 575 to a desired degree.

While an example manner of implementing the 3D build material cleaning manager 550 of FIG. 5 is illustrated in FIG. 6, one or more of the elements, processes and/or devices illustrated in FIG. 6 may be combined, divided, re-arranged, omitted, eliminated and/or implemented in any other way. Further, the example airflow manager 610, the example vibration manager 620, the example diverter manager 630, the example timer 640 and/or, more generally, the example 3D build material cleaning manager 550 of FIG. 6 may be implemented by hardware, software, firmware and/or any combination of hardware, software and/or firmware. Thus, for example, any of the example airflow manager 610, the example vibration manager 620, the example diverter manager 630, the example timer 640 and/or, more generally, the example 3D build material cleaning manager 550 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example airflow manager 610, the example vibration manager 620, the example diverter manager 630, the example timer 640 and/or, more generally, the example 3D build material cleaning manager 550 is/are hereby expressly defined to include a non-transitory computer readable storage device or storage disk such as a memory, a digital versatile disk (DVD), a compact disk (CD), a Blu-ray disk, etc. including the software and/or firmware. Further still, the example 3D build material cleaning manager 550 of FIG. 2 may include one or more elements, processes and/or devices in addition to, or instead of, those illustrated in FIG. 6, and/or may include more than one of any or all of the illustrated elements, processes and devices.

Figure 7:
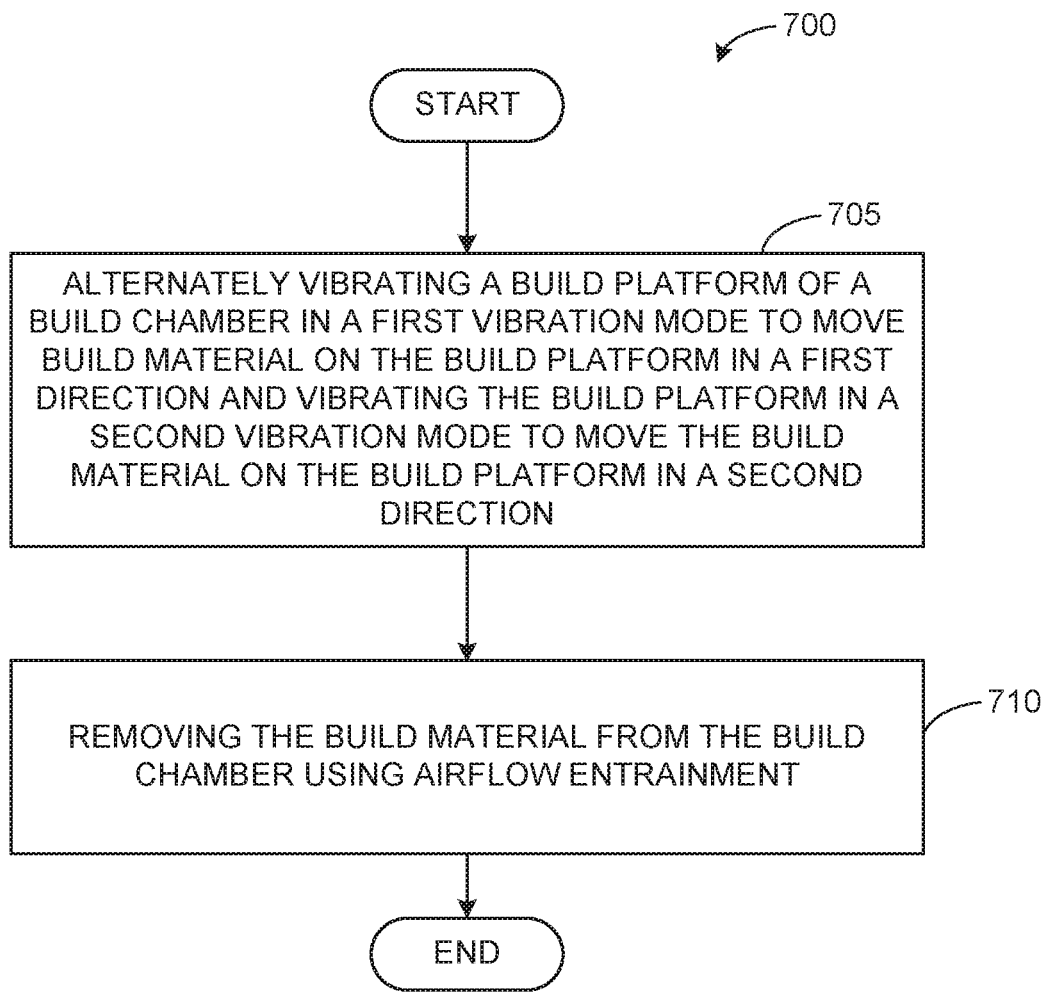
FIG. 7 is an example flowchart representative of an example method which may be executed to implement the example 3D printer of FIGS. 1-5 and/or the example build material cleaning manager of FIG. 6 in accordance with teachings of this disclosure.
Figure 8A:
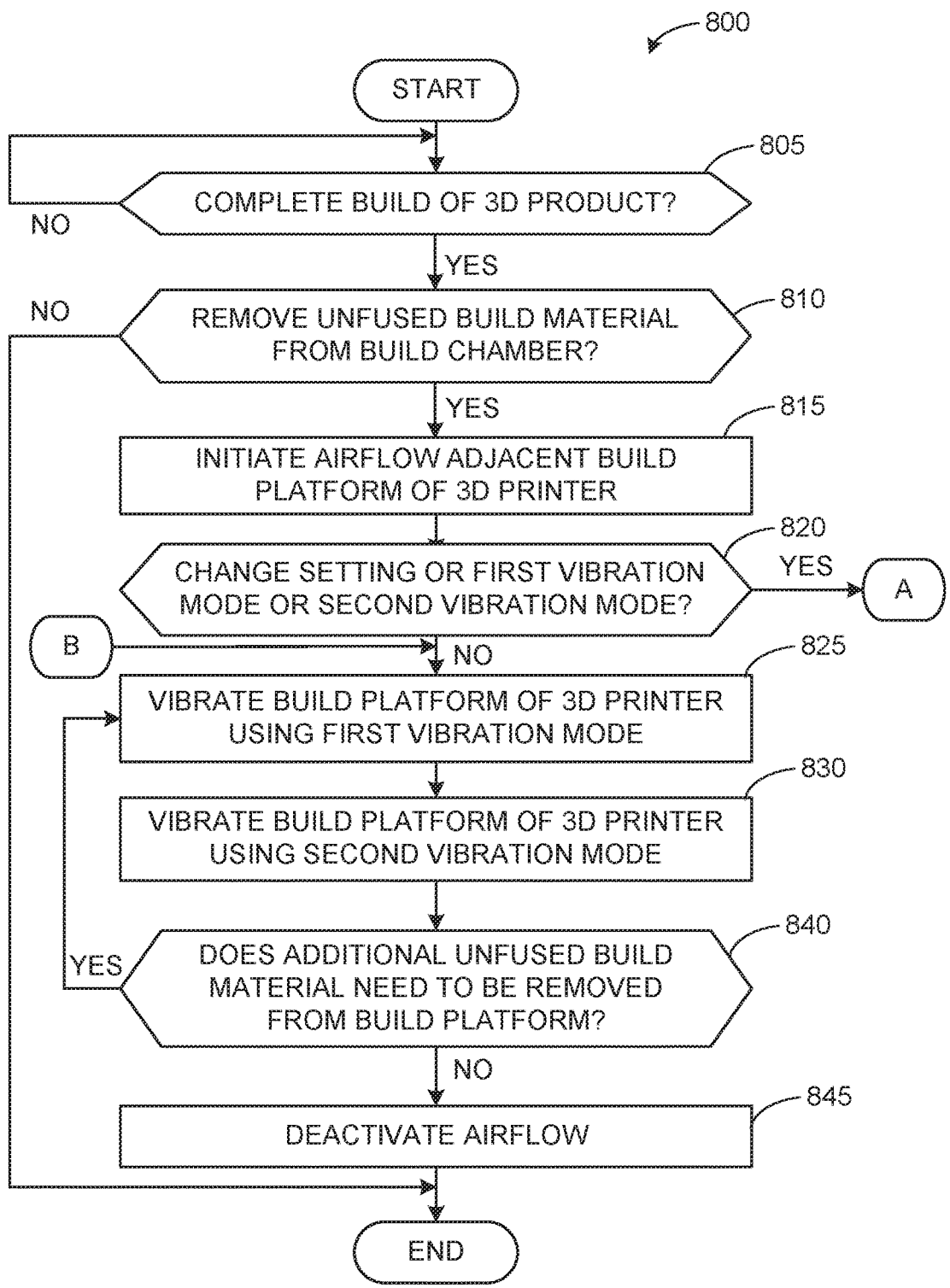
FIGS. 8A-8B is an example flowchart representative of example method which may be executed to implement the example 3D printer of FIGS. 1-5 and/or the example build material cleaning manager of FIG. 6 in accordance with teachings of this disclosure.
Figure 8B:
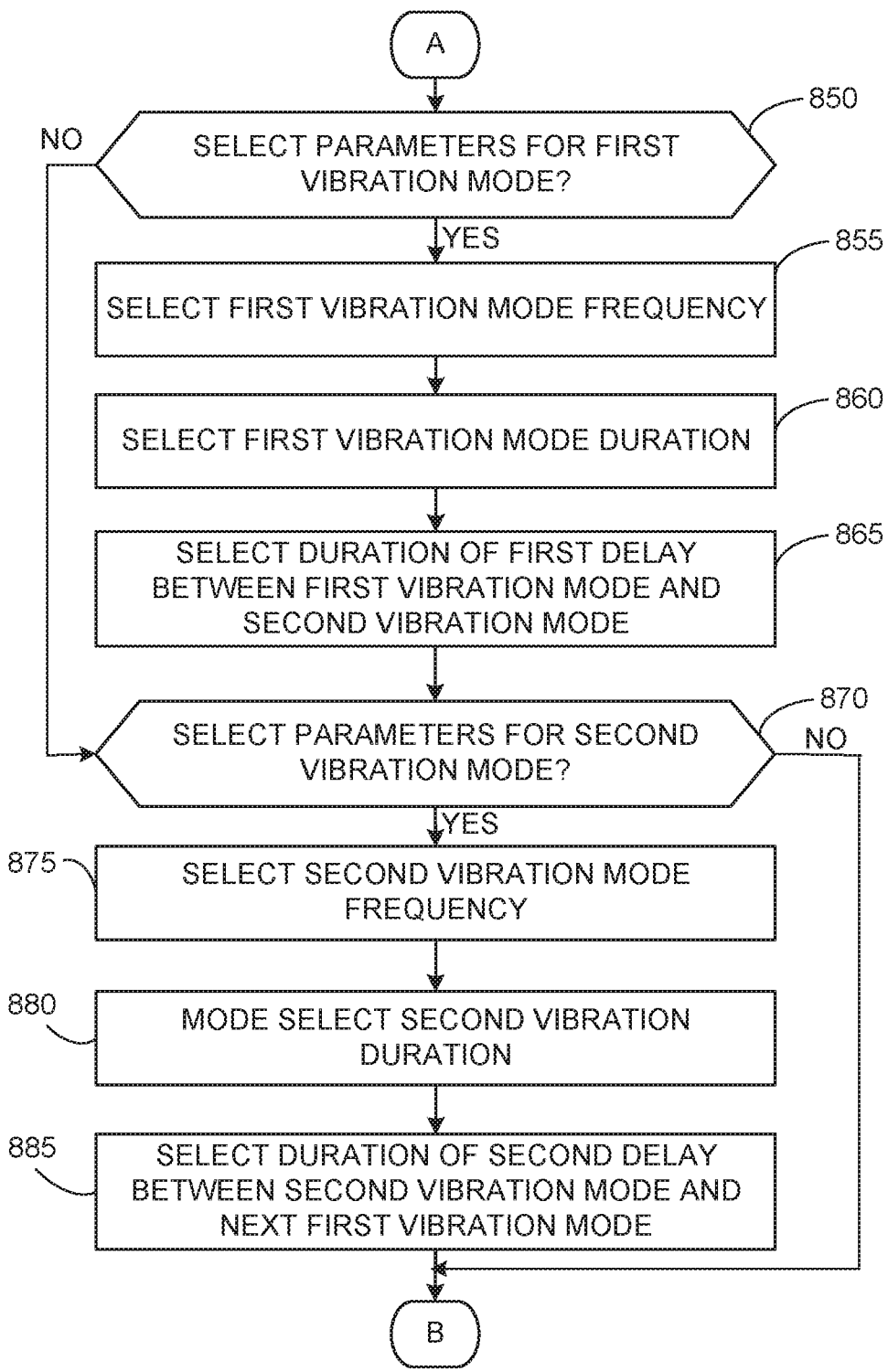
Figure 9:
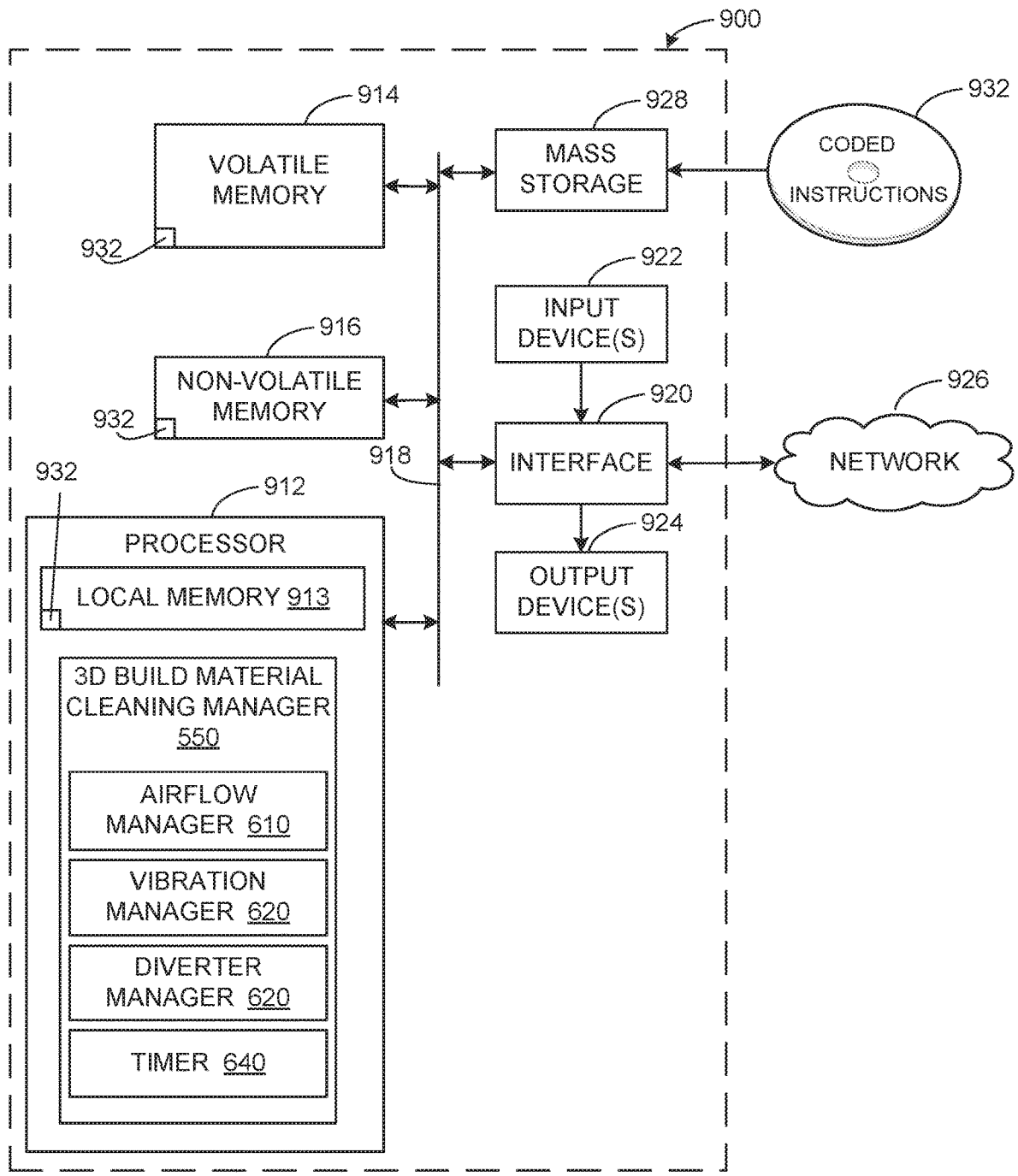
FIG. 9 is a block diagram of an example processor platform which may execute the example instructions of FIGS. 7 and 8A-8B to implement the example 3D printer of FIGS. 1-5 and/or the example build material cleaning manager of FIG. 6 in accordance with teachings of this disclosure.

A flowchart representative of example machine readable instructions for implementing the 3D build material cleaning manager 550 of FIGS. 5-6 is shown in FIGS. 7 and 8A-8B. In this example, the machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 7 and 8A-8B, many other methods of implementing the example 3D build material cleaning manager 550 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example programs of FIGS. 7 and 8A-8B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program 700 of FIG. 7 implements a method of removing build material from the example 3D printer build chamber 575 and begins at block 805 with the example vibration manager 620 and the example timer 640 of the example 3D build material cleaning manager 550 alternately vibrating the build platform 110 of the 3D printer build chamber 575 in a first vibration mode to move build material on the build platform in a first direction (e.g., corresponding to one of the example of FIG. 2 or FIG. 3) and vibrating the build platform 110 in a second vibration mode to move the build material on the build platform 110 in a second direction (e.g., corresponding to other one of the example of FIG. 2 or FIG. 3). The method of removing build material from the 3D printer build chamber 575 continues at block 810 with the removing of the build material from the build chamber 575 using airflow entrainment under the control of the example airflow manager 610 and the example timer 640 of the example 3D build material cleaning manager 550 and/or a sensor 595 disposed in or adjacent the build chamber 575.

The program 800 of FIGS. 8A-8B implements a method 800 of removing build material from the example 3D printer build chamber 575 and begins at block 805 where a determination is made as to whether a build of an example product 502 has been completed. In some examples, block 805 is determined to be satisfied (block 805="YES") when the print manager 510 communicates a completion of the build of the example product 502 to the example 3D build material cleaning manager 550. If block 805 is determined not to be satisfied (block 805="NO"), such as by the print manager 510 and/or the example 3D build material cleaning manager 550, control passes back to block 805 to continue inquiry as to a state of completion of the example product 502.

Once it is determined that the example product 502 is completed (e.g., block 805="YES") by the print manager 510 and/or 3D build material cleaning manager 550, the decision is made at block 810 by the print manager 510 and/or the example 3D build material cleaning manager 550 as to whether unfused 3D build material (e.g., print powder) is to be removed from the build chamber 575. If the unfused 3D build material is not to be removed from the build chamber 575 for any reason (block 810="NO"), the method 900 ends.

If the unfused 3D build material is to be removed from the build chamber 575 (block 810="YES"), the example 3D build material cleaning manager 550 passes control to block 815, where the example 3D build material cleaning manager 550 initiates airflow adjacent the example built platform 110 of the example 3D printer 500 via the example airflow manager 610.

At block 820, the example 3D build material cleaning manager 550 determines whether settings of the first vibration mode or the second vibration mode need to be changed. If the result at block 820 is affirmative (block 820="YES"), control passes to block 850 of FIG. 8B, discussed below. If the result at block 820 is negative (block 820="NO"), control passes to block 825 of FIG. 8A.

At block 825, the example vibration manager 620 of the example 3D build material cleaning manager 550 causes the example vibration generator 200 to vibrate the example build platform 110 of the example 3D printer 500 using a first vibration mode. In some examples, the example vibration manager 620 and the example timer 640 cause the example vibration generator 200 to vibrate the example build platform 110 at one or more frequencies in a first range of frequencies (e.g., at a fixed frequency between about 20 Hz-50 Hz, at a plurality of different frequencies between about 20 Hz-50 Hz, etc.) for a first period of time (e.g., between 1-10 seconds, etc.). In some examples, the example vibration manager 620, in cooperation with the example timer 640, causes the example vibration generator 200 to pause vibration of the example build platform 110 at one or more times before, during or after the first vibration mode. Thus, the first vibration mode implemented by the example vibration manager 620 may include a variety of different vibrations at the one or more frequencies in the first range of frequencies.

At block 830, the example vibration manager 620 of the example 3D build material cleaning manager 550 causes the example vibration generator 200 to vibrate the example build platform 110 of the example 3D printer 500 using a second vibration mode. In some examples, the example vibration manager 620 and the example timer 640 cause the example vibration generator 200 to vibrate the example build platform 110 at one or more frequencies in a second range of frequencies (e.g., at a fixed frequency between about 55 Hz-150 Hz (+/−3 Hz), at a plurality of different frequencies between about 55 Hz-150 Hz (+/−3 Hz), etc.) for a second period of time (e.g., between 1-10 seconds, etc.). In some examples, the example vibration manager 620, in cooperation with the example timer 640, causes the example vibration generator 200 to pause vibration of the example build platform 110 at one or more times before, during or after the second vibration mode. Thus, the second vibration mode implemented by the example vibration manager 620 may include a variety of different vibrations at the one or more frequencies in the second range of frequencies.

At block 840, the example 3D build material cleaning manager 550 determines if additional unfused build material needs to be removed from the build platform 110 and/or build chamber 575. In some examples, an output from the sensor(s) 595 (e.g., level switch, image sensor, load cell, acoustic sensor, photoswitch, etc.) in or adjacent the build chamber 575 is used by the example 3D build material cleaning manager 550 to determine whether the recycling operation is complete and whether an additional iteration of application of the first vibration mode and/or second vibration mode via the vibration manager 620 and the vibration generator 200 should be performed to remove additional unfused build material from the build platform 110 and/or build chamber 575. If the result at block 840 is affirmative (block 840="YES"), control passes back to block 825 and the 3D build material cleaning manager 550, via the vibration manager 620 and the vibration generator 200, again implements the first vibration mode and/or second vibration mode. If the result at block 840 is negative (block 840="NO"), control passes back to block 845, where the airflow manager 610 deactivates the air handler 548. In some examples, the airflow manager 610 deactivates the air handler 548 following a lapse of a predetermined period of time following receipt of the instruction from the 3D build material cleaning manager 550 to deactivate the air handler 548 to ensure that all unfused build material from the chamber 400 and appurtenant lines is removed before the airflow manager 610 deactivates the air handler 548.

As noted above, if the example 3D build material cleaning manager 550 determines that settings of the first vibration mode and/or the second vibration mode need to be changed at block 820 (block 820="YES"), control passes to block 850 (FIG. 8B) where the example 3D build material cleaning manager 550 and/or the example vibration manager 620 determine whether parameters for the first vibration mode are to be selected. If the result at block 850 is "NO," control passes to block 870. If the result at block 850 is "YES," control passes to block 855, where the example 3D build material cleaning manager 550 and/or the example vibration manager 620 sets a first vibration mode frequency to frequency in a first range of frequencies (e.g., between about 20 Hz-50 Hz). Control then passes to block 860 where the example 3D build material cleaning manager 550 and/or the example vibration manager 620 sets a first vibration mode duration (e.g., 1 second, 2 seconds, 3 seconds, etc.). Control then passes to block 865 where the example 3D build material cleaning manager 550 and/or the example vibration manager 620 sets a duration of a first delay (e.g., 0 seconds, 1 second, 2 seconds, 3 seconds, etc.) between the first vibration mode and the second vibration mode.

Control then passes to block 870 where the example 3D build material cleaning manager 550 and/or the example vibration manager 620 determine whether parameters for the second vibration mode are to be selected. If the result at block 870 is "NO," control passes to block 825 of FIG. 8A. If the result at block 870 is "YES," control passes to block 875, where the example 3D build material cleaning manager 550 and/or the example vibration manager 620 sets a second vibration mode frequency to frequency in a second range of frequencies (e.g., between about 55 Hz-150 Hz). Control then passes to block 880 where the example 3D build material cleaning manager 550 and/or the example vibration manager 620 sets a second vibration mode duration (e.g., 1 second, 2 seconds, 3 seconds, etc.). Control then passes to block 885 where the example 3D build material cleaning manager 550 and/or the example vibration manager 620 sets a duration of a second delay (e.g., 0 seconds, 1 second, 2 seconds, 3 seconds, etc.) between the second vibration mode and first vibration mode.

FIG. 8 is a block diagram of an example processor platform 900 capable of executing the instructions of FIGS. 7 and 8A-8B to implement the apparatus of FIG. 6. The processor platform 900 can be, for example, a server, a personal computer, a mobile device (e.g., a cell phone, a smart phone, a tablet such as an iPad™), a personal digital assistant (PDA), an Internet appliance, a DVD player, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 implements the example 3D build material cleaning manager 550, the example airflow manager 610, the example vibration manager 620, the example diverter manager 630 and/or the example timer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926

(e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 7 and 8A-8B may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that use a combination of vibrational modes and/or a combination of vibrational modes with airflow to facilitate removal and recycling of unused 3D build material (e.g., print powder, etc.) and efficiently clean a 3D printer build chamber. The efficient cleaning and increased recycling efficiency helps to reduce a cost-per-part cost and helps to enhance a customer experience by minimized interaction of a user with the 3D build material.

Example 1 includes a 3D printer including a build platform, a vibration generator to alternately apply a first vibration mode to the build platform to move build material on the build platform in a first direction, and to apply a second vibration mode to the build platform to move the build material in a second direction and an air handler to generate an airflow to remove the build material from the build platform.

Example 2 includes the 3D printer of claim 1, wherein the first direction includes a selected first direction and the second direction includes a selected second direction.

Example 3 includes the 3D printer of claim 1 or claim 2, wherein a bottom of the build platform includes a chamber connected to the air handler.

Example 4 includes the 3D printer of any of claims 1-3, wherein the build platform includes a plurality of through holes to provide fluid communication between a top of the build platform and the chamber at the bottom of the build platform.

Example 5 includes the 3D printer of any of claims 1-4, wherein the chamber at the bottom of the build platform includes a flow inlet at a first end of the chamber and a flow outlet at a second end of the chamber, the chamber to be maintained at a negative pressure during a build material recycling operation.

Example 6 includes the 3D printer of any of claims 1-5, wherein the vibration generator includes at least one of a mechanical shaker or an electrodynamic shaker.

Example 7 includes the 3D printer of any of claims 1-6, wherein the vibration generator is operatively coupled to the bottom of the build platform.

Example 8 includes the 3D printer of any of claims 1-7, wherein the vibration generator is to, in the first vibration mode, vibrate the build platform at one or more frequencies in a first range of frequencies and the vibration generator is to, in the second vibration mode, vibrate the build platform at one or more frequencies in a second range of frequencies different than the first range of frequencies.

Example 9 includes the 3D printer of any of claims 1-8, wherein the vibration generator is to alternately apply a plurality of cycles of a first vibration and a second vibration mode.

Example 10 includes the 3D printer of any of claims 1-9, wherein the vibration generator is to apply, in a first cycle, a first vibration at a first frequency in the first range of frequencies and a second vibration at a second frequency in the second range of frequencies.

Example 11 includes the 3D printer of any of claims 1-10, wherein the vibration generator is to apply, in a second cycle, a third vibration at a third frequency in the first range of frequencies.

Example 12 includes the 3D printer of any of claims 1-11, wherein the vibration generator is to apply, in the second cycle, a fourth vibration at a fourth frequency in the second range of frequencies.

Example 13 includes the 3D printer of any of claims 1-12, wherein the first range of frequencies is between about 35 Hz to about 45 Hz and wherein the second range of frequencies is between about 55 Hz to about 75 Hz.

Example 14 includes the 3D printer of any of claims 1-13, wherein the vibration generator is to, in the first vibration mode, vibrate the build platform at the one or more of the frequencies in the first range of frequencies for a first period between about 1-10 seconds, and wherein the vibration generator is to, in the second vibration mode, vibrate the build platform at the one or more frequencies selected from the second range of frequencies for a second period between about 1-10 seconds.

Example 15 is a method of removing build material from a 3D printer build chamber, the method including alternately vibrating a build platform of a build chamber in a first vibration mode to move build material on the build platform in a first direction and vibrating the build platform in a second vibration mode to move the build material on the build platform in a second direction and removing the build material from the build chamber using airflow entrainment.

Example 16 includes the method of claim 15, wherein the removing of the build material from the build chamber using airflow entrainment includes moving air through the build chamber at least substantially concurrent with the vibrating of the build platform in the first vibration mode and the vibrating of the build platform in the second vibration mode.

Example 17 includes the method of claim 15 or claim 16, wherein the removing of the build material from the build chamber using airflow entrainment includes forming a negative pressure in a chamber beneath the build platform to assist movement of the build material on the build platform through a plurality of through holes extending through the build platform to the chamber.

Example 18 includes the method of any one of claims 15-17, wherein the first vibration mode vibrates the build platform at one or more frequencies in a first range of frequencies and the second vibration mode vibrates the build platform at one or more frequencies in a second range of frequencies different than the first range of frequencies.

Example 19 includes the method of any of claims 15-18, wherein the first range of frequencies is between about 35 Hz to about 45 Hz and the second range of frequencies is between about 55 Hz to about 75 Hz.

Example 20 is a tangible computer readable storage medium comprising instructions that, when executed, cause a machine to at least alternately vibrate a build platform of a 3D printer build chamber in a first vibration mode to move build material on the build platform in a first direction and vibrate the build platform in a second vibration mode to move the build material in a second direction and remove the build material from the build chamber via airflow entrainment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. By way of example, the example print cleaning manager may implement various additional combinations of the first vibration mode and the second vibration mode such as, but not limited to, a sequence of two first vibration modes followed by a second vibration mode and/or a first vibration mode followed by two second vibration modes. In some examples, the vibration generator is to alternately apply a plurality of cycles (e.g., two or more cycles) of a first vibration mode and a second vibration mode, wherein one or more vibrations in the first vibration mode and/or one or more vibrations in the second vibration mode may differ (e.g., in frequency, in duration, in sequence, etc.) from one or more vibrations in the first vibration mode and/or one or more vibrations in the second vibration mode in a second cycle.

What is claimed is:

1. A 3D printer, comprising:
   a build platform;
   a vibration generator to alternately apply a first vibration mode to the build platform to move build material on the build platform in a first direction, and to apply a second vibration mode to the build platform to move the build material in a second direction; and
   an air handler to generate an airflow to remove the build material from the build platform.

2. The 3D printer of claim 1, further comprising a user interface for control of the vibration generator, wherein the first direction includes a user-selected first direction and the second direction includes a different, user-selected second direction.

3. The 3D printer of claim 1, further comprising a chamber attached to a bottom of the build platform, the chamber connected to the air handler, the air handler to create a flow of air below the build platform in the chamber, wherein the build platform includes a plurality of through-holes to provide fluid communication between a top of the build platform and the chamber at the bottom of the build platform.

4. The 3D printer of claim 1, further comprising a timer to control a length of time the vibration generator applies the first or second vibration mode.

5. The 3D printer of claim 3, wherein the chamber at the bottom of the build platform includes a flow inlet at a first end of the chamber and a flow outlet at a second end of the chamber, the chamber to be maintained at a negative pressure during a build material recycling operation.

6. The 3D printer of claim 1, further comprising a vibration manager comprising a circuit to control vibration of the build platform, wherein the vibration generator is in communication with the vibration manager, the vibration manager to control the alternating of the vibration generator between the first and second vibration modes.

7. The 3D printer of claim 6, wherein the vibration generator is operatively coupled to a bottom of the build platform.

8. The 3D printer of claim 6, wherein, under control of the vibration manager, the vibration generator is to, in the first vibration mode, vibrate the build platform at one or more frequencies in a first range of frequencies and the vibration generator is to, in the second vibration mode, vibrate the build platform at one or more frequencies in a second range of frequencies different than the first range of frequencies.

9. The 3D printer of claim 8, wherein, under control of the vibration manager, the vibration generator is to alternately apply a plurality of cycles of the first vibration mode and the second vibration mode.

10. The 3D printer of claim 8, wherein the vibration generator is to apply, in a first cycle of the plurality of cycles, a first vibration at a first frequency in the first range of frequencies and a second vibration at a second frequency in the second range of frequencies.

11. The 3D printer of claim 10, wherein the vibration generator is to apply, in a second cycle of the plurality of cycles, at least one of a third vibration at a third frequency in the first range of frequencies or a fourth vibration at a fourth frequency in the second range of frequencies.

12. A method of operating the 3D printer of claim 1 for removing build material from a 3D printer build chamber comprising the build platform, the method comprising:
   alternately vibrating the build platform of the build chamber in the first vibration mode to move build material on the build platform in a first direction and vibrating the build platform in the second vibration mode to move the build material on the build platform in a second direction; and
   removing the build material from the build chamber using airflow entrainment from the air handler.

13. The method of claim 12, wherein the removing of the build material from the build chamber using airflow entrainment includes moving air through the build chamber at least substantially concurrent with the vibrating of the build platform in the first vibration mode and the vibrating of the build platform in the second vibration mode.

14. The method of claim 13, wherein the removing of the build material from the build chamber using airflow entrainment includes forming a negative pressure in a chamber beneath the build platform to assist movement of the build material on the build platform through a plurality of through holes extending through the build platform to the chamber.

15. A tangible computer readable storage medium comprising instructions that, when executed, cause a machine to at least:
   alternately vibrate a build platform of a 3D printer build chamber in a first vibration mode to move build material on the build platform in a first direction and vibrate the build platform in a second vibration mode to move the build material in a second direction; and
   remove the build material from the build chamber via airflow entrainment.

16. A 3D printer, comprising:
   a build platform;
   a vibration manager comprising a circuit to control vibration of the build platform;
   a vibration generator in communication with the vibration manager, the vibration generator, under control of the vibration manager, to apply a first vibration mode to the build platform, the first vibration mode to move build material on the build platform in a first direction toward an interior of the build platform, and to apply a second, different vibration mode to the build platform to move the build material in a second direction toward a periphery of the build platform, the vibration generator to alternately apply the first vibration mode and the second vibration mode to the build platform; and
   an air handler to generate an airflow to remove the build material from the build platform.

17. The 3D printer of claim 16, wherein the build platform comprises a number of holes to pass build material from an upper build surface of the build platform to a space below the build platform, the holes arranged in an ovoid shape around a central portion of the build platform.

18. The 3D printer of claim 16, a user interface to accept user input to the vibration manager to control parameters of the first and second vibration modes of the vibration generator.

19. The 3D printer of claim 16, further comprising a chamber underneath the build platform to receive build material from an upper surface in the build platform through holes extending through the build platform, the air handler to generate the airflow in the chamber underneath the build platform.

20. The 3D printer of claim 19, further comprising a diverter to selectively direct build material entrained in the airflow to either a build material store or a separate recycled build material store.

\* \* \* \* \*